(12) United States Patent
Lehmann et al.

(10) Patent No.: US 11,375,771 B2
(45) Date of Patent: Jul. 5, 2022

(54) DISPOSABLE INSOLE PADS AND USE THEREOF

(71) Applicant: HENKEL IP & HOLDING GMBH, Duesseldorf (DE)

(72) Inventors: Sun Hee Lehmann, Belle Mead, NJ (US); Yuhong Hu, Belle Mead, NJ (US); Cynthia Cain, Flemington, NJ (US); Michael Harwell, Flemington, NJ (US); Joanne Georgiana, Clinton, NJ (US)

(73) Assignee: HENKEL AG & CO. KGaA, Dusseldorf (DE)

( * ) Notice: Subject to any disclaimer, the term of this patent is extended or adjusted under 35 U.S.C. 154(b) by 345 days.

(21) Appl. No.: 16/520,460

(22) Filed: Jul. 24, 2019

(65) Prior Publication Data

US 2019/0343228 A1 Nov. 14, 2019

Related U.S. Application Data

(63) Continuation of application No. PCT/US2018/014379, filed on Jan. 19, 2018.
(Continued)

(51) Int. Cl.
*A43B 17/00* (2006.01)
*A43B 17/10* (2006.01)
(Continued)

(52) U.S. Cl.
CPC .......... *A43B 17/105* (2013.01); *A43B 17/006* (2013.01); *A43B 17/14* (2013.01);
(Continued)

(58) Field of Classification Search
CPC ..... A43B 17/00; A43B 17/003; A43B 17/006; A43B 17/08; A43B 17/10; A43B 17/105;
(Continued)

(56) References Cited

U.S. PATENT DOCUMENTS 3,340,875 A 9/1967 Dudley et al.
3,812,044 A 5/1974 Connor et al.
(Continued)

FOREIGN PATENT DOCUMENTS

EP 0930053 A1 7/1999
EP 0921436 B1 3/2002
(Continued)

OTHER PUBLICATIONS

Kitagawa et al., "Power Law Relationship between Yield Stress and Shear Modulus for Glassy Polymers", 1977, Journal of Polymer Science, vol. 15, pp. 1601-1611 (Year: 1977).*
(Continued)

*Primary Examiner* — Zachary M Davis
(74) *Attorney, Agent, or Firm* — Sun Hee Lehmann; Steven C. Bauman

(57) ABSTRACT

Disposable insole pads and use thereof are disclosed. The disposable insole pads are multilayer structures comprising a topsheet and a pressure sensitive adhesive, and optionally a backsheet, silicone coating and liner layers. The pressure sensitive adhesive layer allows the disposable insole pads to be positioned, repositioned and removed, making them well suited for daily use and disposal.

20 Claims, 6 Drawing Sheets

Related U.S. Application Data

(60) Provisional application No. 62/451,223, filed on Jan. 27, 2017.

(51) Int. Cl.
   *A43B 17/14* (2006.01)
   *B32B 7/06* (2019.01)
   *B32B 7/12* (2006.01)

(52) U.S. Cl.
   CPC .................. *B32B 7/06* (2013.01); *B32B 7/12* (2013.01); *B32B 2307/54* (2013.01); *B32B 2307/726* (2013.01); *B32B 2307/758* (2013.01); *B32B 2437/02* (2013.01)

(58) Field of Classification Search
   CPC ...... C09J 133/00; C09J 133/02; C09J 133/04; C09J 133/06; C09J 133/062; C09J 133/064; C09J 133/066; C09J 133/068; C09J 133/08; C09J 133/10; C09J 133/12; C09J 133/14; C09J 133/16; C09J 133/18; C09J 133/20; C09J 133/22; C09J 133/24; C09J 133/26
   See application file for complete search history.

(56) References Cited

U.S. PATENT DOCUMENTS

| | | | |
|---|---|---|---|
| 3,852,897 | A | 12/1974 | Singh et al. |
| 4,289,513 | A | 9/1981 | Brownhill et al. |
| 4,356,190 | A | 10/1982 | Kraskin |
| 4,864,740 | A * | 9/1989 | Oakley ................ A43B 1/0045 36/44 |
| 5,620,796 | A | 4/1997 | Kawabata et al. |
| 5,935,671 | A | 8/1999 | Lhuillier |
| 6,048,676 | A | 4/2000 | De Leener et al. |
| 6,203,810 | B1 | 3/2001 | Alemany et al. |
| 7,047,671 | B2 | 5/2006 | Steed et al. |
| 7,270,889 | B2 | 9/2007 | Campbell et al. |
| 7,375,161 | B2 | 5/2008 | Takashima |
| 7,721,467 | B2 | 5/2010 | Cheskin et al. |
| 7,745,505 | B2 | 6/2010 | Liu et al. |
| 7,883,495 | B2 | 2/2011 | Nonnenmann et al. |
| 8,024,872 | B2 | 9/2011 | Pettis |
| 8,252,425 | B2 | 8/2012 | Lee et al. |
| 8,394,888 | B2 | 3/2013 | Morino et al. |
| 8,796,350 | B2 | 8/2014 | Liu et al. |
| 9,155,354 | B2 | 10/2015 | Descamp |
| 2002/0066209 | A1 | 6/2002 | Steed |
| 2002/0137420 | A1 | 9/2002 | Dacey |
| 2006/0237579 | A1* | 10/2006 | Doubleday ........... A61F 15/002 242/595 |
| 2007/0227044 | A1 | 10/2007 | Maxson |
| 2009/0090028 | A1 | 4/2009 | Moramarco et al. |
| 2014/0209229 | A1 | 7/2014 | Yang |
| 2017/0292040 | A1* | 10/2017 | Aleed .................... C09J 133/08 |

FOREIGN PATENT DOCUMENTS

| | | |
|---|---|---|
| EP | 1629738 A1 | 3/2006 |
| RU | 132960 U1 | 10/2013 |
| WO | 9422500 A1 | 10/1994 |
| WO | 9425077 A1 | 11/1994 |
| WO | 2003038785 A1 | 5/2003 |
| WO | 2004/033578 A1 | 4/2004 |
| WO | 2015197318 A1 | 12/2015 |

OTHER PUBLICATIONS

Cooper, Sean. "Dahlquist Criterion | Practical Adhesion Science | Prof Steven Abbott", May 4, 2016, Retrieved from https://www.stevenabbott.co.uk/practicai-adhesion/dahlquist.php on Jun. 17, 2020.

Houtman, C. et al. "Properties of Water-Based Acrylic Pressure Sensitive Films in Aqueous Environments" 2000 TAPPI recycling symposium : Mar. 5-8, 2000, pp. 1-9; Washington, D.C.

Ouyang, J. and Brase, I. "UV Curable Solution Acrylic PSA with Optical Clarity" 2009, pp. 1-10. Retrieved from https://pdfs.semanticscholar.org/a835/98b49918879f0a25967f99fed6f803dde7c5.pdf.

Stimpert, D. "Shoe Glossary: Insoles." Retrieved from http://shoes.about.com/od/choosingtherightstyle/g/insole.htm on May 16, 2016.

Leyden, James J. et al. "Skin Microflora" The Journal of Investigative Dermatology, vol. 88, No. 3, Mar. 1987, The Society for Investigative Dermatology, Inc., p. 65s-72s.

Fukuzawa, Keiji, "Pressure Sensitive Adhesive Technology," tranlated by LV Fengting, 1st Edition, New Times Press, Jun. 1985, pp. 13-14, 20-21, 23-24.

Houbin, Li et al. "Applied Chemistry for Packaging," 1st Edition, Printing Industry Press, Jan. 2014, p. 123.

* cited by examiner

DISPOSABLE INSOLE PADS AND USE THEREOF

FIELD OF THE INVENTION

The present invention relates to disposable insole pads and use thereof. More particularly, the invention relates to materials and adhesive compositions of the disposable insole pads that allow them to be positioned, repositioned and removed, making them well suited for daily use and disposal.

BACKGROUND OF THE INVENTION

Insole or inner sole is the inside part of the shoe that runs underneath and supports the bottom of the foot. Traditional insoles are typically comprised of bonded layers of material such as foams, gels, plastics, fabrics or leathers which are molded and trimmed to conform to the inner lining of a shoe's footbed, and respectively, to the sole of a human's foot.

As a user wears the shoes, temperatures generally rise therein, causing sweat glands to secrete perspiration, particularly between the sole of the user's foot and the insole of the shoe. This may further be compounded if the user is barefooted and without socks, depending upon the level of breathable attributes formed within the shoe or insole of the shoe. In recent times, fashion and lifestyle trends have substantially shifted from shoes being worn with socks of minimal coverage, fitted to, or just above the ankle, to shoes again being worn completely sockless. However, such minimalist style shoes still remain widely subject to such bacteria issues when worn sockless. Despite the described negative attributes associated with bacteria formed therein, many footwear manufactures today have quickly realized this substantial market trend and have respectively responded with an abundance of minimalist style shoes, specifically designed to be worn in direct contact to the user's foot. As such residual perspiration accumulates, harmful bacteria forms, creating a warm, sticky and odor-filled environment that generally becomes increasingly intensified each day the shoes are worn. Exfoliated dead skin cells and other soils may additionally collect therein, further accentuating the problem and compromising comfort to the user.

To address the problem, two types of odor-reducing products have been made widely available on the market today: deodorizers and insole pads. Deodorizers are typically sold as powders or sprays to decrease odor and bacterial growth; however, they tend to accumulate exfoliated dead skin cells and residue on the insoles. The accumulated soil and residue is unsightly and can damage the insole over time. Insole pads can be separately added as a replacement or placed on top of the original insole for added comfort or support. They can be permanently or irremovably attached to the original shoes insole or footbed. Unfortunately most, if not all pads are adapted specifically for reducing or masking the odor rather than adapting to a more absorbent type article that can be easily laundered on a daily basis such as are other ordinary undergarments. Moreover, the bulk of deodorizing or other type insoles currently offered are configured as a do-it-yourself, universal sizing concept requiring the insoles or inserts to be cut-to-fit by the user. Although the universal configurations are practical for reducing manufacturing costs, the task presented to the consumer is time consuming and inconvenient, particularly in disposable applications where the user may go through many inserts in a year's time. Furthermore, shears, knifes or blades are required to trim such inserts to fit, exposing the user to unnecessary laceration type hazards. In addition, insoles with activated charcoal laminate have a typical thickness ranging from about 1-4 mm, and while such thick pads are well suited for athletic or comfort shoes, they are not suited for shoes that are tight fitting for feet or open-style shoes, e.g., sandals. In addition, some insoles may be removed and washed by hand, the process for many is time consuming, impractical and cumbersome if attempted on a daily basis. Majority of such modern insoles are manufactured, all or in part of synthetic materials, and washing and drying them tend to distort the insole's form, often to a degree that prevents re-use.

What is lacking and needed in the art is a disposable, shoe insole pad that is intended for shorter, even daily use, and provides an effective means of absorbing moisture and reducing odor, without damaging the original shoe insole, or leaving or minimizing exfoliated dead skin cells and soils on the insole. The encouragement to promote more frequent, even daily, exchange of pads will enhance foot hygiene, especially for those who do not wear socks or stocking. There is a need in the art for disposable insole pads that allow them to be positioned, repositioned and removed without damaging the original shoe insole. The current invention fulfills this need.

BRIEF SUMMARY OF THE INVENTION

One embodiment is directed to a disposable pad having a multilayer structure comprising: (a) a topsheet layer, (b) an adhesive layer; and (c) optionally, a release liner. The adhesive is a pressure sensitive adhesive, having a storage modulus (G') of less than $1 \times 10^5$ Pascal at 40° C. The topsheet may further comprise an absorbent layer and a backsheet layer.

Another embodiment is directed to a kit comprising (a) a support structure having a first side and a second side, and (b) a disposable insole pad having a multilayer structure. The disposable insole pad comprises (i) a topsheet layer; (ii) an adhesive layer, which is a pressure sensitive adhesive; and (iii) optionally, a release liner. The topsheet may further comprise an absorbent layer and a backsheet layer. The adhesive layer of the pad adheres onto the first side of the support structure, where the first side of the support structure faces upward, away from the bottom of the shoe. The disposable pads may be positioned, repositioned and removed from the support structure. The support structures is made with materials that allows the disposable pad to be positioned, repositioned and removed for up to 30 times without damaging the support structure. The support structure, optionally, comprises a second adhesive on the second side, where this may be attached to the shoe insole.

In another embodiment, the invention is directed to a linerless multilayer disposable pad comprising a topsheet layer and an adhesive layer. The linerless disposable pad is perforated to separate into two distinct portions. The topsheet may further comprise an absorbent layer and a backsheet layer. The adhesive layer is a pressure sensitive adhesive, having a storage modulus (G') of less than $1 \times 10^5$ Pascal at 40° C. The pads can be stacked where the adhesive layer of one pad is stacked on top of the absorbent layer. The pads can be released individually from the stack with slight pressure upward. Optionally, a silicone release agent is coated on the absorbent layer for easy release.

Yet another embodiment is directed to a linerless, disposable pad comprising an absorbent layer having a first side and a second side and having a length X. The pad is foldable in a butterfly flap, having ¼ X fold at a left end and ¼ X fold at a right end, ½ X fold at a middle. Upon folding, the second side is on the inside fold and the first side is on the outside fold. Yet in another embodiment, the linerless, disposable pad may be folded as a tri-fold, having a fold at ⅓ X and ⅔ X. All or portions of the second side is coated with a PSA, having a storage modulus (G') of less than 1×10$^5$ Pascal at 40° C. Portions of the second side may optionally be coated with a silicone release agent. The pads can be stacked for transport, and may be released individually from the stack with slight pressure upward.

Another embodiment is directed to a disposable pad comprising an absorbent layer having a first side and a second side. The second side is coated with an adhesive. A liner is optionally placed on the other side of the adhesive. The first side is optionally coated with a silicone release agent. The disposable pads are rolled on a holder or on a coreless roll, where a single disposable pad can be dispensed from a receptacle housing designated to hold the rolled disposable pads.

All of the above disposable shoe pad may be provided with a wearer fastening means whereby the pad is provided with means to be attached to the foot of the wearer as opposed to the footbed of the shoe.

DETAILED DESCRIPTION OF THE INVENTION

A "disposable" article is described herein is to be either fully or only partially discarded after a single use. Thus, "disposable" articles can comprise a single inseparable structure, in which the entire article is disposable, or may also comprise articles having a kit of a support structure with a disposable pad, in which only disposable pads are disposable.

As used herein, the terms "disposable pad" refer to articles that are placed against or in proximity to the body of a wearer to protect against microbes and bacteria, and/or to absorb and contain the various discharges, specifically perspiration, from the body.

As used herein, the term "pressure sensitive adhesive" or "PSA" refers to a viscoelastic material which adheres instantaneously to most substrates with the application of slight pressure and remains permanently tacky. A polymer is a PSA within the meaning of the term as used herein if it has the properties of a PSA per se or functions as a PSA by admixture with diluent and other additives.

The disposable pads are designed for shoes, leg cuffs, tummy bands, under arm, side panels, and other portions which could possibly also come into contact with perspiration. In another embodiment, the pads may be designed as liners for shared-head gears, shared-clothing and shared-gloves to protect against body fluids, microbes and insects.

The disposable pad, at a minimum, comprises a topsheet layer and an adhesive layer.

Figure 1A:
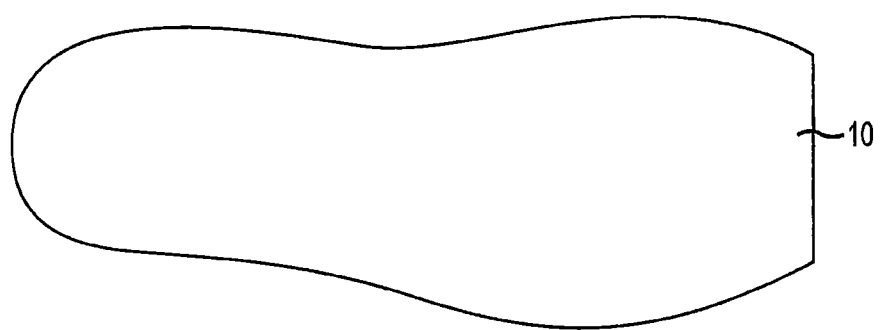
FIG. 1A is a top view schematic of a disposable shoe pad.
Figure 1B:
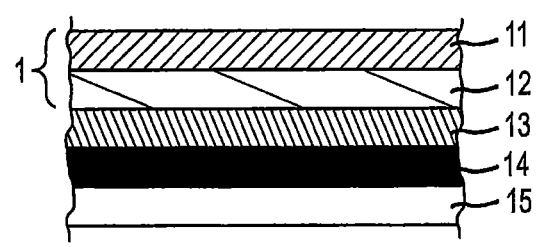
FIG. 1B is a cross-sectional schematic of a disposable shoe pad.
Figure 2A:
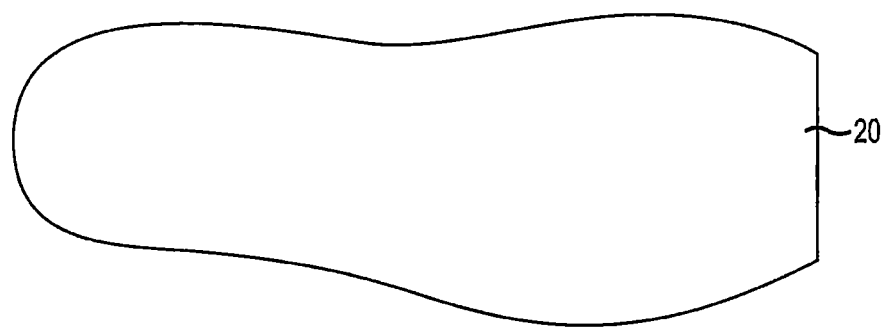
FIG. 2A is a schematic of a disposable shoe pad with a support structure.
Figure 2B:
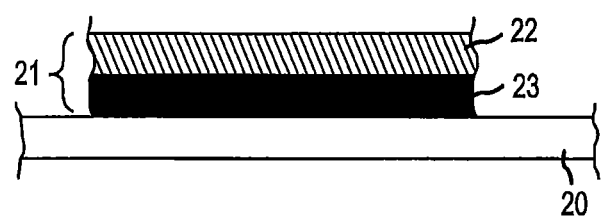
FIG. 2B is a cross-sectional schematic of a disposable shoe pad with a support structure.
Figure 2C:
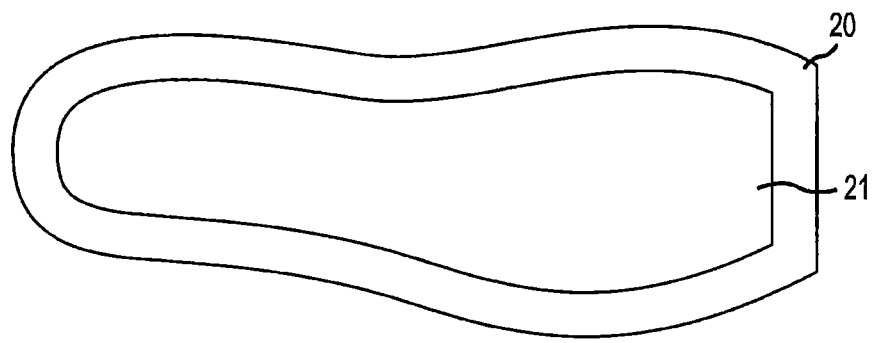
FIG. 2C is a bottom view schematic of a disposable shoe pad with a support structure.
Figure 3A:
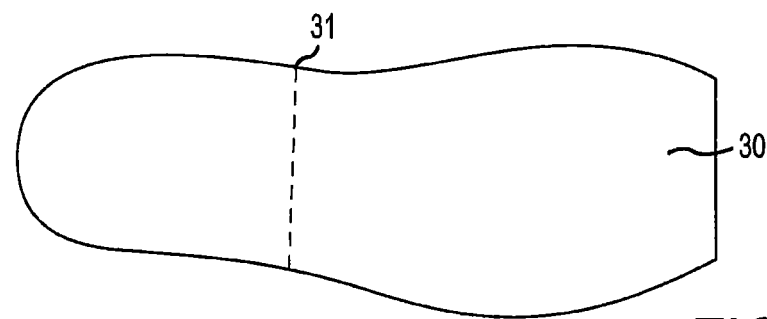
FIG. 3A is a schematic of a linerless, multilayer, perforated to separate into two distinct portions, disposable pad.
Figure 3B:
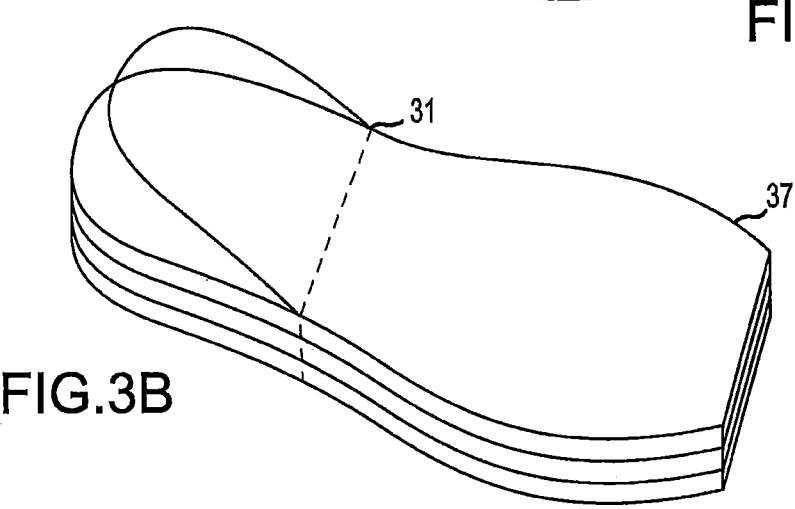
FIG. 3B is a schematic of a stacked linerless, multilayer, perforated disposable pad.
Figure 3C:
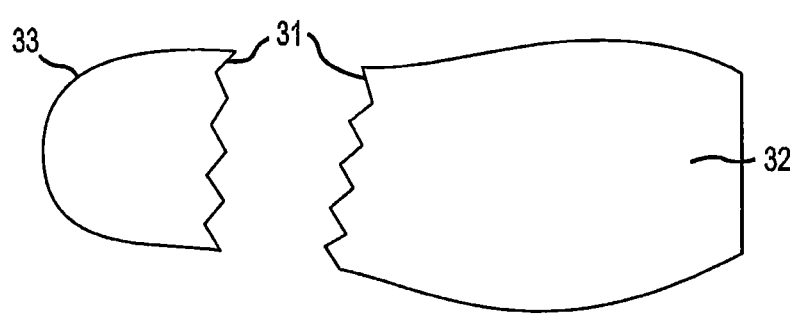
FIG. 3C is a schematic of a separate heel and ball portions of the disposable pad.
Figure 3D:
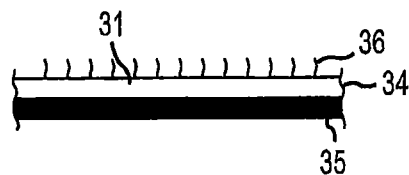

Further details of the disposable pads are illustrated in FIG. 1A, which is a top view of the insole, 10. A cross-section of the disposable pad is also illustrated in FIG. 1B, with a topsheet layer 11 and an adhesive layer 14. The topsheet may optionally further comprise an absorbent layer 12 and a backsheet layer 13. A liner 15 may, optionally, be added to protect the adhesive layer.

The adhesive coating layer ranges from about 1 to about 50 gsm (grams per square meter). The adhesive is a PSA, having a storage modulus (G') of less than about 1×10$^5$ Pascal at 40° C. and greater than about 1×10$^2$ Pascal at 40° C. Preferably the storage modulus is less than about 5×10$^4$ Pascal, and more preferably, less than 1×10$^4$ Pascal. The storage modulus in the stated ranges allows for strong adhesion to the substrates, quick wetting-out to the substrates, while also allowing for the repositioning and removal of the adhesive from the substrate.

Storage modulus (G') describes the elastic properties of the adhesive. To determine the storage modulus of the adhesive, a TA Dynamic Mechanical Analyzer (Model RDA 700) can be used to obtain the storage or elastic modulus (G') versus temperature, using Orchestrators software version 7.2.0.4. Parallel plates 7.9 mm in diameter and separated by a gap of about 1 mm were used. The adhesive sample was loaded and then cooled to about −100° C. and the time program started. The program test increased the temperature at 5° C. intervals followed by a soak time at each temperature of 10 seconds. The convection oven containing the sample was flushed continuously with nitrogen. The frequency was maintained at 10 rad/s. The initial strain at the start of the test was 0.05% (at the outer edge of the plates). An autostrain option in the software was used to maintain an accurately measurable torque throughout the test. The option was configured such that the maximum applied strain allowed by the software was 80%. The autostrain program adjusted the strain at each temperature increment if warranted using the following procedure. If the torque was below 200 g-cm the strain was decrease by 5% of the current value. If the torque was above 1200 g-cm it was decreased by 25% of the current value. At torques between 200 and 1200 g-cm no change in strain was made at that temperature increment. The storage or elastic modulus (G') is calculated by the software from the torque and strain data.

The disposable shoe pads of the present invention comprise a topsheet layer. Suitable topsheets layer may comprise a single layer or a multiplicity of layers. The topsheet as a whole and hence each layer individually needs to be compliant, soft feeling, and non-irritating to the wearer's skin. It also can have elastic characteristics allowing it to be stretched in one or two directions. The topsheet may be formed from any of the materials available for this purpose and known in the art, such as nonwoven fabrics, films or combinations of both. Nonwoven fabrics may be formed as flat, porous sheets made directly from individual fibers, from molten plastic, and/or plastic film. Suitable nonwoven fabrics materials that may be useful in the present invention also include, but are not limited to spunbond, meltblown, spunmelt, solvent-spun, electrospun, carded, film fibrillated, melt-film fibrillated, air-laid, dry-laid, wet-laid staple fibers, and other and other nonwoven web materials formed in part or in whole of polymer fibers, as known in the art. In a preferred embodiment of the present invention at least one of the layers of the topsheet comprises a liquid permeable aperture polymeric film. Preferably, the upper layer is provided by a film material having apertures which are provided to facilitate liquid transport from the wearer facing surface towards the absorbent structure. A suitable commercially available topsheet for use herein is apertured nonwoven available from PGI, Inc.

The topsheet layer of the disposable pad may further comprise an absorbent layer. The absorbent layer comprises various materials, including, for example, tissue, cotton, cellulose, pulp, superabsorbent polymers (SAP), tow fibers, creped cellulose wadding, absorbent foams, absorbent sponges, absorbent gelling materials, fiberized cellulose, fluff pulp having tissue or synthetic materials, and/or any equivalent material or combination of materials. Also tissues of sufficient basis weight and absorbency can be used as the absorbent layer according to the present invention. With zoned absorbency, for example, more absorbent capacity may be located in particular regions of the disposable absorbent pad.

A backsheet layer may be placed against the absorbent layer to contain and prevent any absorbed extrudes wetting the shoe footbed. Suitable backsheets for use herein include all backsheets known in the art. The backsheet is typically a polymeric film. Exemplary films include DH292 and DH276 film commercially available from Clopay Corporation of Cincinnati, Ohio. Other exemplary films include K11-815 and CEX-826 elastomer film commercially available from Tredegar Film Products of Richmond, Va.

According to the present invention, the disposable pad is constructed by joining the various elements such as topsheet, backsheet and absorbent core by any means well known in the art. For example, the backsheet and/or topsheet may be joined to the absorbent core or to each other by a continuous layer of construction adhesive, a patterned layer of adhesive, or an array of separate lines, spirals or spots of adhesive. Alternatively, the elements may be joined by heat bonds, pressure bonds, ultrasonic bonds, dynamic mechanical bonds or any other suitable joining means known in the art and any combination thereof. In one embodiment, the joining the elements may be done with any construction hot melt adhesive for disposable articles construction, including Henkel's TECHNOMELT DM 3430B, TECHNOMELT DM 901B or TECHNOMELT DM LITE 300.

The adhesive layer is coated on the other side of the backsheet with the pressure sensitive adhesive of the invention. The disposable shoe pad liner may optionally cover the adhesive with a removable release paper or film in order to prevent the adhesive from drying out or adhering to another surface other than the garment prior to use. A liner may be placed on the backsheet against the adhesive for storage. The liner is discarded immediately prior to use and the disposable pad may be placed against or in proximity of the body. Any commercially available release paper or liner film may be used.

For some embodiments, in lieu of a liner, the disposable shoe pad liner is optionally coated with a release agent or a silicone release agent in select areas. The coated pads can be stacked for storage and transport. No liners are necessary except for the very last pad.

In some embodiment, the linerless pads are folded and stacked. The stacks of the pads are readily removable from each other without damaging the other linerless pads.

FIGS. 2A, 2B, 2C and 2D are schematics of a kit that comprises a support structure with a disposable shoe pad. A support structure 20 is the same size or slightly larger than the disposable pad 21. The disposable pad has a topsheet layer 22 and an adhesive layer 23, where the adhesive layer contacts the top side of the support structure. The disposable shoe pad is removable and repositionable without touching the actual footbed of the shoe or the original insole of the shoe. The bottom side of the support structure, optionally comprises an adhesive, either the same or a different adhesive 23, to be adhered onto the footbed or the original insole of the shoe.

FIGS. 3A, 3B, 3C and 3D are schematics of a linerless, multilayer, perforated to separate into two distinct portions, disposable pad. The pad 30 has a perforation 31 and the pad can be separated along the perforation with force into one heel 33 piece and one ball 32 pieces. The disposable pad comprises an adhesive layer 35, a topsheet layer 34, and is optionally coated with a silicone release agent 36. The disposable pads may be stacked where the adhesive layer is in contact with the release agent and each disposable pad can be easily separated from the stack without leaving any adhesive residue on the disposable pad. The separated disposable pads are attached to the ball and heal areas of the shoe. It is envisioned that these separated pads allow fuller coverage of the footbed for smaller shoes and smaller coverage of the footbed for large shoes.

Figure 4A:
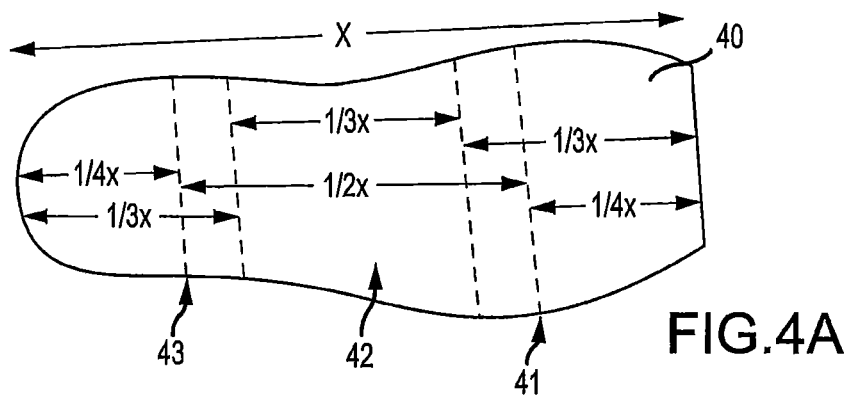
FIG. 4A is a schematic of a linerless and foldable disposable shoe pad.
Figure 4B:
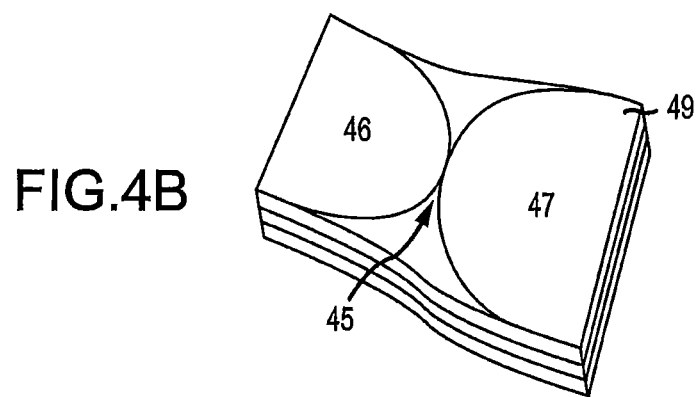
FIG. 4B is a schematic of linerless, stacked and folded disposable shoe pad.
Figure 4C:
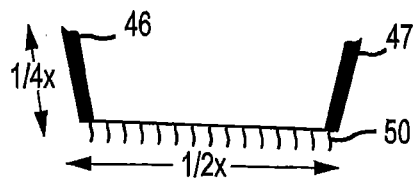
FIG. 4C is a schematic of a butterfly flap linerless and foldable disposable shoe pad with dimensions.

FIGS. 4A, 4B, 4C and 4D are schematics of a linerless, multilayer, foldable disposable pad. The foldable disposable pad 40 folds in a butterfly flap, as shown in FIGS. 4B and 4C, having a length of X and a top side and a bottom side. The left fold 43 is at ¼ X and the right fold 41 is also at ¼ X, with the middle 42 having a length of ½ X. Both folds meet in the middle of the pad 45. The folds occur so that the top side is folded inward and the bottom side is on the outside of the fold. The top side, upon unfolding, faces the foot, and the bottom side adheres onto the footbed. The outer fold of left portion 46 and right portion 47 is coated with adhesive. The other side of the outer fold 50 is optionally coated with silicone release agent. The folded disposable pads can be stacked 49 for storage. Each pad can be removed from the stack, without tack and without damaging other pads.

Figure 4D:
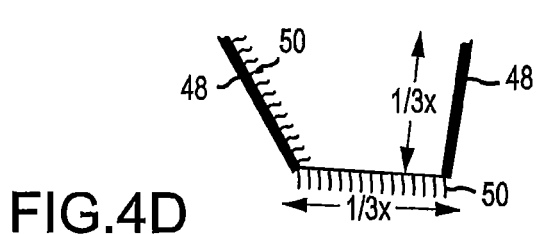
FIG. 4D is a schematic of a tri-fold linerless and foldable disposable shoe pad with dimensions.
Figure 5A:
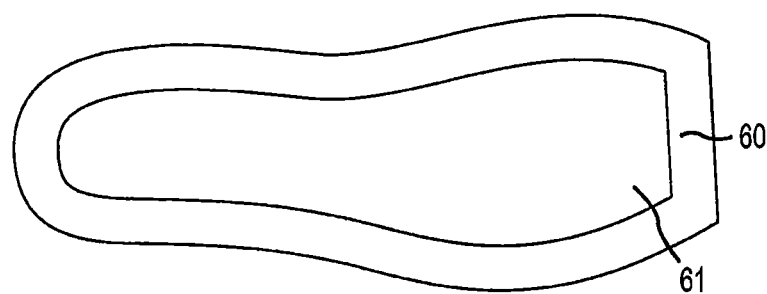
FIG. 5A is a schematic of adhesive coatings on disposable shoe pads.
Figure 5B:
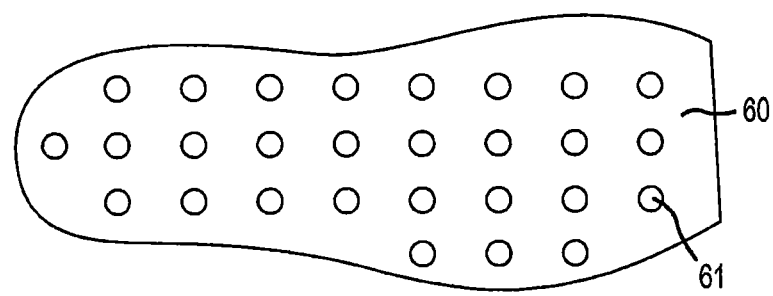
FIG. 5B is a schematic of dot adhesive coatings on disposable shoe pads.
Figure 5C:
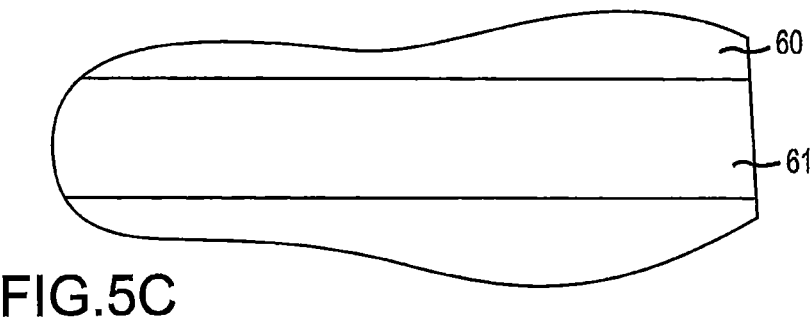
FIG. 5C is a schematic of strip adhesive coatings on disposable shoe pads.
Figure 5D:
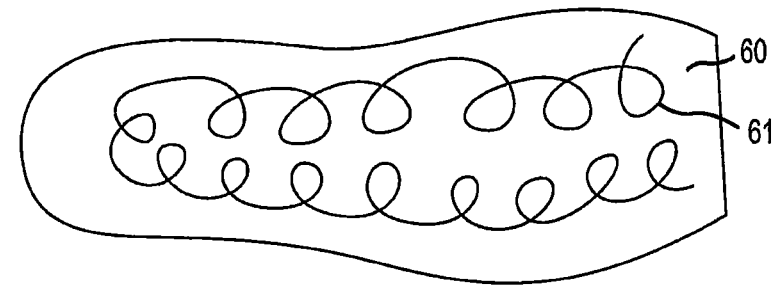
FIG. 5D is a schematic of spiral adhesive coatings on disposable shoe pads.

For trifolded disposable pad, as shown in FIG. 4D, the pad is foldable at ⅓ segments. The two ends of the bottom side are coated with the adhesive 48. The other sides of 48 (top side), both or only one, is coated with silicon release agent 50. The middle top side, depending on the needs of non-tack, may be further coated with silicon release agent 50.

FIGS. 5A, 5B, 5C and 5D are schematics of various patterns of the adhesives on the disposable pads. The adhesive is applied onto the back of the pads 60. The adhesive may be coated as a areas, dots, strip or spiral, 61, leaving a portion of the absorbent backing free of the adhesive coating. Depending on the strength of the adhesive, more area or less area of the backing is covered with the adhesive. Also, the thickness of the adhesive coatings can be varied to balance the tack and removal. The adhesive may also be coated in a specific pattern, e.g., blocks, lines, multilines, dots fiberizaton, spiral. A liner optionally covers the adhesive for storage.

Figure 6A:
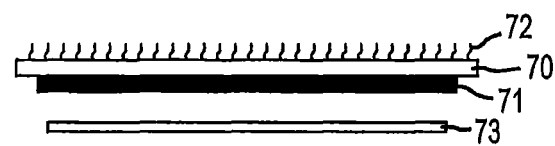
FIG. 6A is a schematic of a singly dispensed disposable shoe pad.
Figure 6B:
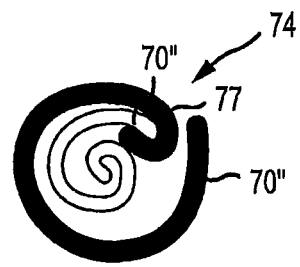
FIG. 6B is a schematic of a disposable shoe pad in a rolled form.
Figure 6C:
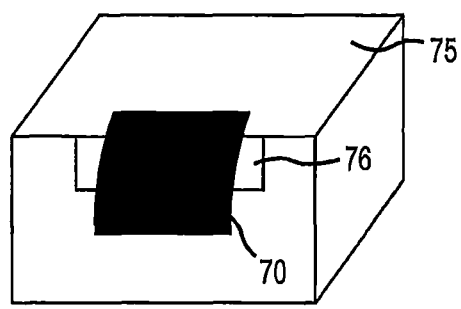
FIG. 6C is a schematic of a disposable shoe pad in a rolled form in a housing designated to hold the rolled disposable pads.

FIG. 6 is a schematic of a rolled disposable pads that can be dispensed singly. The disposable pad has an topsheet layer 70 having a first side and a second side. The second side is coated with an adhesive 71. A liner, 73, is optionally placed on the other side of the adhesive or the first side is optionally coated with a silicone release agent 72. The disposable pads are rolled on a holder or on a coreless roll 74. Each pad 70' and 70" overlaps 77 a small segment for dispensing. The length of overlap 77 may vary depending on the roll, and may be defined by a skilled artisan. The disposable pad can be dispensed from an opening 76 from a receptacle housing 75 designated to hold the rolled disposable pads. As each disposable pad is pulled out with a small force from the housing, a small segment of the next disposable pad protrudes, same length as the overlap 77, out from the opening 76.

It is envisioned that perforated disposable pads may also be dispensed in a similar manner. For ease of use, the disposable pads are either stacked or rolled in a housing for convenient packaging.

In one embodiment, the hot melt PSA of the disposable pad is prepared by combining a polymer, and optionally, a tackifier, a plasticizer, a wax, a stabilizer and an additive.

Useful polymers include alternating blocks of rigid and elastomeric segments, including styrenic block copolymers, also known as rubber-based polymers. Styrenic block copolymers may be linear or radial with multiple arms, greater than 3. Examples of styrene block copolymers include styrene-butadiene-styrene (SBS), styrene-isoprene-styrene (SIS), styrene-isoprene-butadiene-styrene (SIBS), styrene-ethylene/butylene-styrene (SEBS), styrene-ethylene/propylene copolymers (SEPS) and the like. Typical examples of styrenic block copolymers are KRATON® D SBS and SIS grades, KRATON® G SEBS, TSRC VECTOR® and TAIPOL® grades may be used as styrenic block copolymers in the adhesive. A suitable commercially available hot melt PSA adhesive using styrenic block copolymers for use herein is Henkel's TECHNOMELT DF 8045M.

Other useful block copolymers include acrylic block copolymers. Block copolymers that may be used in the practice of the invention will generally be multiblock polymers wherein greater than about 50 weight % of the polymer comprises at least 2 hard blocks per molecule. Examples of block copolymers include those having the formula -A-B-A- and (-A-B-)n-Xm. Particularly preferred are block copolymers of the formula -[A1]-[B]-[A2]-. In the above representative formulations, A, A1 and A2 each represents a polymer block having a glass transition temperature (Tg) of greater than about 30° C. (also referred to as a hard block) and B represents a polymer block having a Tg of less than about 20° C. (also referred to as a soft block) and X represents a multifunctional coupling agent. Polymer block B will preferably be present in amounts of at least 50 weight %. In a particularly preferred embodiment, A1 and A2 is methyl methacrylate and B is n-butyl acrylate. All grades of KURARITY™ LA series from Kuraray may be used as acrylic block copolymers in the adhesive.

The Tg of the acrylic blocks can be determined by differential scanning calorimetry (DSC) conducted at a heating rate of 20° C./minute with 5 mg or smaller samples. The Tg is calculated as the midpoint between the onset and endpoint of heat flow change corresponding to the glass transition on the DSC heat capacity heating curve. The use of DSC to determine Tg is well known in the art, and is described by B. Cassel and M. P. DiVito in "Use of DSC To Obtain Accurate Thermodynamic and Kinetic Data", American Laboratory, January 1994, pp 14-19, and by B. Wunderlich in Thermal Analysis, Academic Press, Inc., 1990.

Additional useful polymers for hot melt PSAs include polyolefin polymers. Polyolefin polymers include C2-C20 copolymers and terpolymers. Depending on the monomer and comonomer selection, and the catalyst in the polymerization, the polyolefin may be substantially amorphous, semicrystalline or crystalline. Depending on the desired crystallinity and molecular weight, various combinations of the monomers may be selected as the polymer for the hot melt adhesives. Both metallocene catalyzed polyolefins with narrow molecular weight distributions and non-metallocene catalyzed (Zigler-Natta catalyzed) polyolefins may be chosen as the base polymer for the adhesive. A suitable commercially available hot melt PSA adhesive using polyolefin copolymers for use herein is Henkel's TECHNOMELT DF 6500.

Examples of preferred polyolefins include ethylene-alpha olefin, e.g., C2 with C3, C4, C5, C6, C7, C8, C9, C10, C11 and/or C12 with a melt index greater than about 5 to about 2,500 g/10 min at 190° C. measured in accordance with ASTM D1238, with the overall crystallinity ranging from about 1% to about 25% of the polymer. Propylene copolymers, e.g., C3 with C2, C4, C5, C6, C7, C8, C9, C10, C11 and/or C12 with a melt index greater than about 5 to about 2,500 g/10 min at 190° C. measured in accordance with ASTM D1238 and overall crystallinity ranging from about 1% to about 25% of the polymer is another preferred olefin. Typical examples of polyolefin polymers are ENGAGE™ and INFUSE™ Olefin Block Copolymers from Dow Chemical, VISTAMAXX™ from Exxon Mobil Chemicals, L-MODU™ from Idemitsu, REXTAC® RT grades from Rextac, AERAFIN™ from Eastman, VESTOPLAST® from Evonik, may be used as polyolefins.

The hot melt PSA comprises from about 10 to about 100 wt %, preferably from about 20 to about 60 wt % based on the total weight of the adhesive, of the polymer content. Also, depending on the polymer, the adhesive may be formed as a hot melt PSA or cast as solvent soluble adhesive.

The adhesive optionally comprises a diluent in the form of a tackifier and/or a plasticizer. The diluent is selected and used in amounts effective to produce the desired properties required for the intended end use.

Tackifier is chosen based on the polymer of the adhesive. Compatibility with the polymer, softening point, viscosity, cytotoxicity and skin sensitivity are primary factors in choosing a particular tackifier. A combination of tackifiers may be used in the adhesive. The tackifier component may typically be present up to about 80 wt %, preferably from about 30 to about 60 wt %, based on the total weight of the adhesive.

Typical tackifiers have Ring and Ball softening points, as determined by ASTM method E28, of about 40° C. to about 150° C., more preferably of about 80° C. to about 130° C.

Useful tackifying resins may include any compatible resin or mixtures thereof such as synthetic hydrocarbon resins and mixtures. Included are aliphatic or cycloaliphatic hydrocarbons, aromatic hydrocarbons, aromatically modified aliphatic or cycloaliphatic hydrocarbons, the hydrogenated derivatives thereof. Aliphatic hydrocarbons C5 tackifying resin in this class is a diene-olefin copolymer of piperylene and 2-methyl-2-butene having a softening point of about 95° C. Examples of this resin are WINGTACK 95® from Cray Valley, ESCOREZ™ 1304 from Exxon Mobil Chemicals, PICCOTAC™ 1095 from Eastman, and HAITACK™ JH 3201 from Jinhai. Cycloaliphatic hydrocarbons C5 tackifying resin is available commercially under the trade name of QUINTONE® 100 series and 300 series from Zeon. Aromatically modified aliphatic hydrocarbons resins such as those available from Cray Valley under the trade name of WINGTACK® Extra, WINGTACK® Plus, WINGTACK® ET, ESCOREZ™ 2203LC from Exxon Mobil Chemicals, PICCOTAC™ 9095 from Eastman, and HAITACK™ JH 3200 from Jinhai are also useful in the invention. Examples of hydrogenated tackifiers particularly suitable include Escorez 5000 series from Exxon Mobil Chemicals, Arkon P100 from Arakawa and Regalite S1100 or Eastotac H100 from Eastman Chemical, and the like. Also included are the cyclic or acyclic C5 resins and aromatic modified acyclic or cyclic resins.

Alphamethyl styrene resins such as Kristalex 3085 and 3100 from Eastman Chemicals, Sylvares SA 100 from Arizona chemicals are also useful as tackifiers in the invention. Mixtures of two or more described tackifying resins may be required for some formulations.

Also useful are aromatic hydrocarbon resins that are C9 aromatic/aliphatic olefin-derived and available from Cray Valley under the trade name NORSOLENE® and from Rutgers series of TK aromatic hydrocarbon resins. NORSOLENE® A-90 is a low molecular weight aliphatic C9 hydrocarbon resin having a Ring and Ball softening point of 90-100° C. and is commercially available from Cray Valley.

In one embodiment, the tackifiers are natural and modified rosins including, for example, as gum rosin, wood rosin, tall oil rosin, distilled rosin, hydrogenated rosin, dimerized rosin, resinates, and polymerized rosin; glycerol and pentaerythritol esters of natural and modified rosins, including, for example as the glycerol ester of pale, wood rosin, the glycerol ester of hydrogenated rosin, the glycerol ester of polymerized rosin, the pentaerythritol ester of hydrogenated rosin. Examples of commercially available rosins and rosin derivatives that could be used to practice the invention include SYLVALITE® RE 100L, SYLVALITE® RE 110L, and SYLVATAC® RE 85 available from Arizona Chemical; WESTREZ® 5101 from Ingevity, and NOVARES® 1100 from Georgia-Pacific. Other tackifiers include copolymers and terpolymers of natured terpenes, including, for example, styrene/terpene and alphamethyl styrene/terpene; polyterpene resins having a softening point, as determined by ASTM method E28-58T, of from about 70° C. to 150° C. Examples of commercially available styrene/terpene resins are SYLVARES™ ZT 106LT from Arizona Chemical and PICCOLYTE® HM106 from Pinova. Other tackifiers are phenolic modified terpene resins and hydrogenated derivatives thereof including, for example, the resin product resulting from the condensation, in an acidic medium, of a bicyclic terpene and a phenol; aliphatic petroleum hydrocarbon resins having a Ball and Ring softening point of from about 70° C. to 135° C. Examples of commercially available phenolic modified terpene resins are Sylvares TP 2040 HM and Sylvares TP 300, both available from Arizona Chemical.

Plasticizer may be in the form of a solid or liquid. Miscibility with the polymer, melting point, viscosity and availability are primary factors in choosing a particular diluent. A combination of diluents may be used in the adhesive. The diluent component may typically be present from about 0 to about 30 wt %, preferably from about 2 to about 15 wt %, based on the total weight of the adhesive.

Suitable plasticizers include polybutenes, polyisobutylene, phthalates, benzoates, adipic esters and the like. Particularly preferred plasticizers include polybutenes and polyisobutylenes, phthalates such as di-iso-undecyl phthalate (DIUP), di-iso-nonylphthalate (DINP), dioctylphthalates (DOP), mineral oil, aliphatic oils, olefin oligomers and low molecular weight polymers, vegetable oil, animal oils, paraffinic oil, naphthenic oil, aromatic oil, long chain partial ether ester, alkyl monoesters, epoxidized oils, dialkyl diesters, aromatic diesters, alkyl ether monoester and mixtures thereof.

The adhesives of the invention may also comprise a wax, stabilizer, and additive.

Waxes suitable for use in the present invention include paraffin waxes, microcrystalline waxes, polyethylene waxes, polypropylene waxes, by-product polyethylene waxes, Fischer-Tropsch waxes, oxidized Fischer-Tropsch waxes and functionalized waxes such as hydroxy stearamide waxes and fatty amide waxes. High density low molecular weight polyethylene waxes, by-product polyethylene waxes and Fischer-Tropsch waxes are conventionally referred to in the art as synthetic high melting point waxes.

When used, the wax component will typically be present in amounts of up to about 10 wt %, based on the total weight of the adhesive. Preferred waxes have a melt temperature between 49° C. and 121° C., more preferably between 66° C. and 110° C., and most preferable between 82° C. and 104° C.

The adhesives of the present invention may further contain a stabilizer or an antioxidant. These compounds are added to protect the adhesive from degradation caused by reaction with oxygen induced by heat, light, or residual catalyst from the raw materials such as the tackifying resin.

The applicable stabilizers or antioxidants included herein are high molecular weight hindered phenols and multifunctional phenols such as sulfur and phosphorous-containing phenol. Hindered phenols are well known to those skilled in the art and may be characterized as phenolic compounds which also contain sterically bulky radicals in close proximity to the phenolic hydroxyl group thereof. In particular, tertiary butyl groups generally are substituted onto the benzene ring in at least one of the ortho positions relative to the phenolic hydroxyl group. The presence of these sterically bulky substituted radicals in the vicinity of the hydroxyl group serves to retard its stretching frequency, and correspondingly, its reactivity; this hindrance thus providing the phenolic compound with its stabilizing properties. Representative hindered phenols include; 1,3,5-trimethyl-2,4,6-tris-(3,5-di-tert-butyl-4-hydroxybenzyl)-benzene, pentaerythrityl tetrakis-3(3,5-di-tert-butyl-4-hydroxyphenyl)-propionate; n-octadecyl-3(3,5-di-tert-butyl-4-hydroxyphenyl)-propionate; 4,4'-methylenebis(2,6-tert-butyl-phenol); 4,4'-thiobis(6-tert-butyl-o-cresol); 2,6-di-tertbutylphenol; 6-(4-hydroxyphenoxy)-2,4-bis(n-octyl-thio)-1,3,5 triazine; di-n-octylthio)ethyl 3,5-di-tert-butyl-4-hydroxy-benzoate; and sorbitol hexa[3-(3,5-di-tert-butyl-4-hydroxy-phenyl)-propionate].

Such antioxidants are commercially available from BASF and include IRGANOX® 565, 1010, 1076 and 1726 which are hindered phenols. These are primary antioxidants which act as radical scavengers and may be used alone or in combination with other antioxidants such as phosphite antioxidants like IRGAFOS® 168 available from BASF. Phosphite catalysts are considered secondary catalysts and are not generally used alone. These are primarily used as peroxide decomposers. Other available catalysts are CYANOX® LTDP available from Cytec Industries and ETHANOX® 330 available from Albemarle Corp. Many such antioxidants are available either to be used alone or in combination with other such antioxidants. These compounds are added to the hot melts in small amounts, typically less than about 10 wt %, based on the adhesive, and have no effect on other physical properties. Other compounds that could be added that also do not affect physical properties are pigments which add color, or fluorescing agents, to mention only a couple. Additives like these are known to those skilled in the art.

Depending on the contemplated end uses of the hot melt PSAs, other additives such as pigments, dyestuffs, fragrance and inorganic fillers conventionally added to hot melt adhesives may be incorporated in minor amounts, i.e., up to about 10% by weight, into the formulations of the present invention.

The hot melt PSA is manufactured by heating and mixing the components together to form a homogeneous molten mixture and applying the mixture to a substrate while molten and cooling the mixture to form an adhesive layer.

In other embodiments, the adhesive layer is a solution acrylic PSA, an emulsion acrylic PSA or an ultraviolet curable PSA.

Solution acrylic PSAs are conventionally used in the manufacture of PSA tapes, the adhesive tape comprising a backing and a PSA composition. Adhesive coatings using the solution acrylic PSA can be manufactured by polymerizing acrylic monomers in a solvent; adding optional components; applying the formulation to a substrate (a backing or a release liner) using well known knife, roll or extrusion die coating methods; drying the coated substrate to remove the solvent; and laminating the exposed surface to a release liner or backing. Among others, optional components include tackifiers, plasticizers, and/or rheology modifiers.

Emulsion acrylic PSAs are surfactant or protective colloid stabilized hydrophobic polymer particles, and upon drying, they impart pressure sensitivity.

UV curable PSAs are solventless, free-radical or cationic curing systems. They are typically manufactured by polymerizing an oligomer (and/or monomers), photoinitator and additives, and adding optional components. Among others, optional components include tackifiers, plasticizers, rheology modifiers, and/or crosslinkers.

The acrylic polymer for solution, emulsion and UV curable systems will typically comprise at least one low glass transition temperature (Tg) alkyl acrylate monomer. Low Tg monomers are those having a homopolymer Tg of less than about 0° C. Preferred alkyl acrylates which may be used to practice the invention have up to about 18 carbon atoms in the alkyl group, preferably from about 4 to about 12 carbon atoms in the alkyl group. Alkyl acrylates for use in the invention include methyl acrylate, butyl acrylate, amyl acrylate, hexyl acrylate, 2-ethylhexyl acrylate, octyl acrylate, isooctyl acrylate, decyl acrylate, dodecyl acrylates, isomers thereof, and combinations thereof. Particularly preferred are butyl acrylate, 2-ethylhexyl acrylate and/or isooctyl acrylate, most preferably 2-ethylhexyl acrylate.

The acrylic polymer may also comprise one or more vinyl ester monomers, particularly preferred is vinyl acetate, and/or may comprise one or more functional monomers. Preferred are carboxy and/or hydroxy functional monomers. Useful carboxylic acids preferably contain from about 3 to about 6 carbon atoms and include, among others, acrylic acid, methacrylic acid, itaconic acid, beta-carboxyethyl acrylate and the like. Acrylic acid, methacrylic acid and mixtures thereof are particularly preferred. Examples of hydroxy functional monomers include hydroxyethyl acrylate, hydroxypropyl acrylate, hydroxyethyl methacrylate and hydroxypropyl methacrylate. Preferred for use is hydroxyethyl acrylate.

The adhesives may also contain a nitrogen containing compound, e.g., N-substituted acrylamides or methacrylamides. Examples include N-vinyl pyrrolidone, N-vinyl caprolactam, N-tertiary octyl acrylamide (t-octyl acrylamide), dimethyl acrylamide, diacetone acrylamide, N-tertiary butyl acrylamide, N-isopropyl acrylamide, N-vinyl acetamide and/or N-vinyl formamide.

The acrylic polymer may optionally further comprise other well-known comonomers including monomers having a high glass transition temperature (i.e., a Tg greater than about 0° C.). Non-limiting examples include methyl acrylate, methyl methacrylate, ethyl acrylate and/or isobutyl methacrylate. Other comonomers can be used to modify the Tg of the acrylic polymer. Such comonomers include styrene, amides such as acrylamide or methacrylamide, and/or nitriles such as acrylonitrile or cyanoethylacrylate.

Minor amounts, sufficient to increase cohesion without gelling the solution, of crosslinkable multifunctional monomers may be used including, for example, glycidyl methacrylate, allyl glycidyl ether, hexanedioldi(meth)acrylate and the like.

Preferred acrylic monomers for UV curable acrylic systems include a soft monomer having a Tg less than 0° C., a hard monomer having a Tg greater than 30° C. and a functional monomer having a functional group consisting of a hydroxyl group, carboxyl group, epoxy, urethane, urea, carbonate or siloxane. A combination of 2-ethylhexyl acrylate, butyl acrylate, octyl acrylate, methyl acrylate, methyl methacrylate, acrylic acid and 2-hydroxyethyl acrylate may be used to form a UV curable acrylic system. Various functional groups are in the polymer to facilitate specific interactions with different parts of the polymer.

The acrylics can further be compounded with a wide range of materials to enhance and alter physical and performance properties such as tackifiers and plasticizers to modify the Tg values of the polymer. Thickeners and rheology modifiers can also be added. The tackifier, plasticizer and/or rheology modifier can be selected and used in amounts effective to produce the desired properties required for the intended end use.

Other additives include fillers, solvents (for improving film forming and wettability properties), defoamers, surfactants, crosslinkers, biocides, coupling agents, antioxidants, light stabilizers, ozone protectants, fatty acids, nucleating agents, blowing agents, pigments, compounding agents and/or accelerators which may be incorporated in minor or larger amounts into the adhesive formulation, depending on the purpose.

The PSA has a glass transition temperature (Tg) value of about −40° C. to about 25° C.

Optionally, odor control agent can be added to the disposable shoe pad liner. In general, odor control agent can be positioned within or on the surface of the disposable absorbent article in any of a number of positions. In any case, the odor control agent would need only be operably located such that the discharge of bodily fluids into the disposable absorbent article.

Any odor control agent or combinations thereof, known in the art for this purpose may be used herein as an odor control system. The odor control agents can be various types of odor eliminating agents, and can also include fragrances (or scents). The odor control agent can be formulated to release the odor control agents immediately, gradually over a period of time after contact with bodily fluids, or a combination thereof.

Odors may be chemically classified as being acidic, basic or neutral. Acidic odor controlling agents have a pH greater than 7 and typically include sodium carbonates, sodium bicarbonates, sodium phosphates, particularly zinc and copper sulphates. Basic odor controlling agents have a pH of less than 7 and include compounds such as carboxylic acids such as citric acid, laric acid, boric acid, adipic acid and maleic acid. Another suitable odor control system for use herein comprises a buffer system, such as citric acid and sodium bicarbonate, sodium phosphate and sorbic acid buffer systems. Also, buffer systems having a pH of from 7 to 10 as described for example in WO 94/25077 may be useful herein.

Other suitable agents include chelating agents and may be selected from amino carboxylates such as for example ethylenediamine-tetracetate, as described for example in U.S. Pat. No. 4,356,190, amino phosphonates such as ethylenediaminetetrakis (methylene-phosphonates), polyfunctionally-substituted aromatic chelating agents as described in U.S. Pat. No. 3,812,044 and mixtures thereof. Without intending to be bound by theory it is believed that the benefit of these compounds is in part due to their exceptional ability to remove iron, copper, calcium, magnesium and manganese ions present in the absorbed fluids and their degradation products by the formation of chelates.

An alternative odor control system utilizes ion exchange resins such as those described in U.S. Pat. Nos. 4,289,513 and 3,340,875.

Masking agents or deodorants such as perfumes may also be used as odor control agents herein. Preferably these agents are used in combination with an additional odor control agent such as zeolite as described in WO 94/22500. Also so called antiperspirants such as aluminum salts for example aluminum chloridrate and aluminum sulphate and anti-microbics such as Triclosan and benzoic, propionic and sorbic acids for example may also be used as odor control agents. Such agents are described in "The Chemistry and Manufacture of Cosmetics" Vol. 3, 2 Ed. pg. 205-208, entitled "Antiperspirants and deodorants", by W. H. Mueller and R. P. Quatrale and "The Journal of Investigative Dermatology", Vol. 88, N. 3, March Suppl. 1987., entitled "Skin Microflora", by J. J. Leydon, K. D. McGinley et al.

Other suitable odor control agents are enzyme blocking agents as described in Cosm. and Toil. 95, 48, 1980, in "Non microbiological deodorizing agents" by R. Osberghaus such as triethyl cytrate and odor absorbers for example zinc ricinoleate as described in Cosmesi Funzionale, pages 465-498, ED. Singerga, 1988, G. Proserpio.

The odor control system of the present invention is preferably selected from any of the above described agents or combinations thereof. Particularly preferred are the antimicrobial agents, deodorants, antiperspirant agents and mixtures thereof. Preferred odor control systems comprising absorbing agents for use herein include the following combinations (i) sodium bicarbonate, silica, AGM and zeolites, preferably in a ratio of from 5:1:1 to 1:1:5 most preferably 3:1:1 to 1:1:3, (ii) zeolites, activated carbon and AGM, (iii) silica and AGM preferably in a ratio of from 5:1 to 1:5, more preferably from 3:1 to 1:3, (iv) zeolites and AGM, (v) silica and zeolites, preferably in a ratio of from 1:5 to 5:1, more preferably from 1:3 to 3:1, (vi) chelating agents, particularly ethylenediamine-tetracetate, and (vii) chelating agents in combination with an the combination of AGM and zeolite or with the combination of AGM, zeolite and activated carbon preferably at a ratio of chelant to additional agents of from 1:10 to 10:1, more preferably from 1:5 to 5:1.

The odor control system may be incorporated into the article by any of the methods disclosed in the art. The odor control agents may be incorporated as a powder or a granulate within the pad. The odor control agent may be distributed homogeneously throughout the pad or any one of the layers thereof, or may be distributed substantially in the center of the pad or substantially on the edges of the pad. The odor control agent may be sprayed or coated onto the top surface that contacts the foot. Any combinations and numbers of surface treatments and internal ingredients may be used to maximize performance for the disposable pad. The odor control agent is preferably in a liquid state and in a one single blend for simplicity in processing and drying. However, more than one liquid application may be executed if necessary. The amount of odor control system incorporated into the pad may be readily determined by those skilled in the art, and a typical treatment/solution add-on ranges from 0.1 to 2.0 grams per pad.

In an alternative embodiment of the present invention the disposable shoe pad may be provided with a wearer fastening means whereby the pad is provided with means to be attached to the foot of the wearer as opposed to the insole.

Typically, the dimension, flexibility, size and shape of the pad will depend on the intended location of the pad on the body and can be easily adapted by the skilled person dependent on the end use. The disposable shoe pads may be provided in a foot shape, and in two mirror image shapes to accommodate the left and right foot. In another embodiment, a universal elongated waning oval shape may be designed to fit both the right and the left foot.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

Examples

For testing, a prototype disposable shoe pad was designed, as drawn in FIG. 1, with a nonwoven topsheet, an absorbent, a backsheet, which was coated with TECHNOMELT DF 8045M, a styrenic block co-polymer pressure sensitive adhesive from Henkel Corporation. The TECHNOMELT DF 8045M has a storage modulus (G') of less than $2.35 \times 10^4$ Pascal at 40° C. Various add-on levels of adhesives were coated onto the backsheet, as described in Table 1. The prototype had weak construction bond and the nonwoven topsheet, absorbent, and backsheet were not bonded together to each other, and could be readily pulled apart from the other layers.

The prototype was placed on top of the shoe lining in the shoe. A wearer wore the shoe with the prototype for at least eight hours. The wearer tested stay-in-place (for comfort) of the prototype in the shoe. The ease of removal of the prototype was also tested. Upon removal of the prototype, the shoe was examined for residue of the adhesive on the shoe lining.

TABLE 1

| Test | Adhesive Add-on (gsm) | Shoe Lining | Stay-in-Place 0 = no movement 1 = slight lifting 2 = moderate lifting 3 = severe lifting | Ease-of-Removal 0 = very easy 1 = moderate 2 = difficult 3 = pulls out shoe lining | Residue 0 = no residue 1 = slightly tacky 2 = very tacky 3 = visible adhesive |
|---|---|---|---|---|---|
| A | 1.5 | Fabric | 1 | 0 | 0 |
| B | 1.5 | suede-like | 1 | 1* | 0 |
| C | 1.5 | synthetic leather | 0 | 0 | 1 |
| D | 1.5 | synthetic leather | 0 | 0 | 0 |
| E | 1.5 | synthetic leather | 0 | 0 | 0 |
| F | 3 | Fabric | 1 | 1* | 0 |
| G | 3 | suede-like | 1 | 1* | 0 |
| H | 3 | synthetic leather | 0 | 0 | 1 |
| I | 3 | synthetic leather | 0 | 1* | 0 |
| J | 9 | Fabric | 0 | 2* | 0 |
| K | 9 | suede-like | 0 | 2* | 0 |
| L | 9 | synthetic leather | 0 | 2* | 1 |

*The layers of the prototype, topsheet or the absorbent layer, pulled away from the backsheet.

The prototype stayed-in-place with either no movement or slight lifting in the shoe for the wearer at all add-on levels. At low add-on levels, the prototype was readily removable with ease or with moderate pull. The backsheet with the adhesive removed with ease. Any difficulty was associated with the delamination of the topsheet from the absorbent or the absorbent from the backsheet, and not associated with the adhesive layer. Because of the delaminations, the ease-of-removal values became artificially higher.

We claim:

1. A disposable shoe pad having a multilayer structure comprising:
   a. a topsheet;
   b. an adhesive layer; and
   c. optionally, a release liner;
   wherein the adhesive is a pressure sensitive adhesive having a storage modulus (G') of greater than $1 \times 10^2$ to less than $1 \times 10^4$ Pascal at 40° C.

2. The disposable shoe pad of claim 1, further comprising an odor control agent.

3. The disposable shoe pad of claim 1, wherein the topsheet further comprises an absorbent layer and/or a backsheet.

4. The disposable shoe pad of claim 1, wherein the adhesive layer comprises a polymer, and optionally, a tackifier, a plasticizer, a wax, optionally a stabilizer, and an additive.

5. The disposable shoe pad of claim 1, wherein the adhesive layer is a layer of a hot melt pressure sensitive adhesive, a solution acrylic pressure sensitive adhesive, an emulsion acrylic pressure sensitive adhesive or an ultraviolet curable pressure sensitive adhesive.

6. The disposable shoe pad of claim 1, wherein the adhesive comprises an acrylic polymer, and optionally, a tackifier, a plasticizer, a rheology modifier, and/or a cross-linker.

7. The disposable shoe pad of claim 1, wherein the adhesive layer covers at least 20% of the area of disposable shoe pad.

8. A kit comprising:
   a. a support structure having a first side and a second side, and
   b. a disposable insole pad having a multilayer structure comprising:
      i. a top sheet;
      ii. a pressure sensitive adhesive layer having a storage modulus (G') of greater than $1 \times 10^2$ to less than $1 \times 10^4$ Pascal at 40° C.; and
      iii. optionally, a release liner;
   wherein the adhesive layer of the disposable insole pad adheres onto the first side of the support structure.

9. The kit of claim 8, wherein the second side of the support structure comprises a second adhesive.

10. The kit of claim 8, further comprising an odor control agent in the disposable insole pad and/or the support structure.

11. The kit of claim 8, wherein the pressure sensitive adhesive layer comprises a polymer, and optionally, a tackifier, plasticizer, a wax, a stabilizer, and an additive.

12. A linerless, disposable pad comprising a topsheet having a top side and a bottom side and a length and a width,
   wherein the disposable pad is perforated along the cross-section perpendicular to the length of the pad;
   wherein the bottom side is coated with a pressure sensitive adhesive having a storage modulus (G') of greater than $1 \times 10^2$ to less than $1 \times 10^4$ Pascal at 40° C.; and
   wherein the top side is optionally coated with a silicone release agent.

13. The linerless, disposable pad of claim 12, wherein the pressure sensitive adhesive is prepared with a polymer and optionally, a tackifier, a plasticizer, a wax, and a stabilizer.

14. The linerless, disposable pad of claim 12, wherein the pressure sensitive adhesive layer is prepared with acrylic polymer, and optionally, a tackifier, a plasticizer, a rheology modifier; and/or a crosslinker.

15. A stack comprising a plurality of the linerless, disposable pad of claim 12, wherein the adhesive of the bottom side of a first disposable pad is placed on the top side of a second disposable pad.

16. A linerless, disposable pad comprising a topsheet having a first side and a second side and having a length X,
   wherein the pad is foldable in a butterfly flap, having ¼ X fold at a left end and ¼ X fold at a right end, ½ X fold at a middle; whereby the second side is on the inside fold and the first side is on the outside fold;
   wherein the first side of the ¼ left fold and the ¼ right fold are coated with a pressure sensitive adhesive having a storage modulus (G') of greater than $1 \times 10^2$ to less than $1 \times 10^4$ Pascal at 40° C.; and wherein the first side of the middle ½ X fold is optionally coated with a silicone release.

17. The linerless, disposable pad of claim 16, further comprising an odor control agent in the topsheet and/or coated on the first side of the topsheet.

18. The linerless, disposable pad of claim 16, wherein the pressure sensitive adhesive is prepared with a polymer, and optionally a tackifier, a plasticizer; a wax, and a stabilizer.

19. The linerless, disposable shoe pad of claim 16, wherein the pressure sensitive adhesive is prepared with an acrylic polymer, and optionally, a tackifier, a plasticizer, a rheology modifier, an additive; and/or a crosslinker.

20. A receptable housing comprising a roll of a plurality of linerless, disposable pad wherein the linerless, disposable pad comprises a topsheet having a top side and a bottom side, the bottom side is coated with a pressure sensitive adhesive having a storage modulus (G') of greater than $1 \times 10^2$ to less than $1 \times 10^4$ Pascal at 40° C.;

the top side is optionally coated with a silicone release agent; and wherein the pad dispenses singly from the receptable housing.

\* \* \* \* \*